Feb. 17, 1970 C. E. CLOUD Re. 26,795
STRAIGHT-LINE VACUUM PACKING
Original Filed Dec. 28, 1960 5 Sheets-Sheet 1
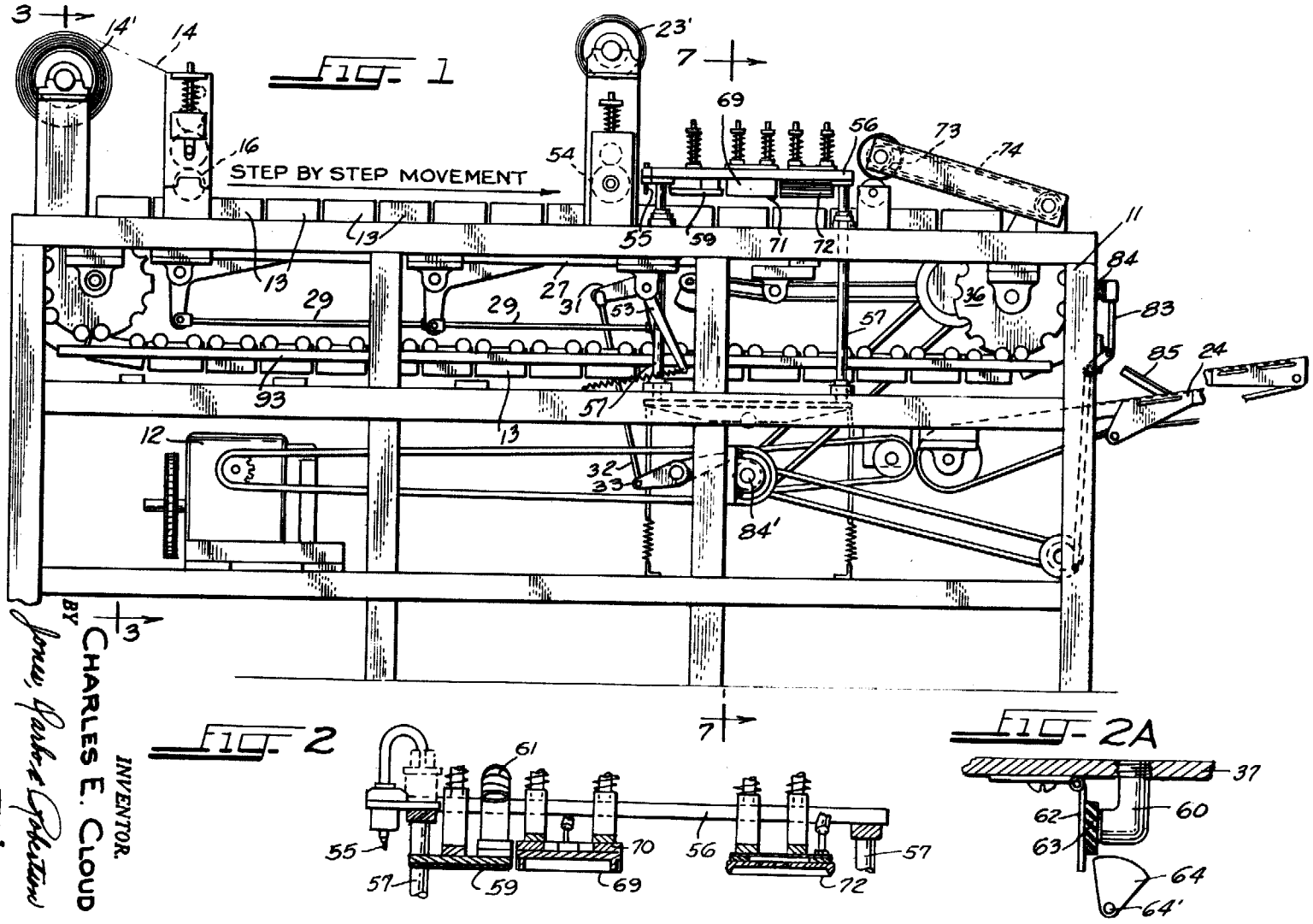
INVENTOR.
CHARLES E. CLOUD
BY Jones, Parker & Robertson
Attys.

STRAIGHT-LINE VACUUM PACKING

Original Filed Dec. 28, 1960 5 Sheets-Sheet 2

INVENTOR.
CHARLES E. CLOUD
BY
Jones, Parks & Robertson
Attys.

STRAIGHT-LINE VACUUM PACKING

Original Filed Dec. 28, 1960 5 Sheets-Sheet 3

INVENTOR.
CHARLES E. CLOUD
BY
Jones Parks & Robertson
Attys.

STRAIGHT-LINE VACUUM PACKING

Original Filed Dec. 28, 1960 5 Sheets-Sheet 3

INVENTOR.
CHARLES E. CLOUD
BY
Jones, Parker & Robertson
ATTYS.

STRAIGHT-LINE VACUUM PACKING

Original Filed Dec. 28, 1960 5 Sheets-Sheet 5

INVENTOR.
CHARLES E. CLOUD
BY
Jones, Parbo & Robertson
ATTYS.

United States Patent Office

Re. 26,795
Reissued Feb. 17, 1970

26,795
STRAIGHT-LINE VACUUM PACKING

Charles E. Cloud, 150 Prairie, Wilmette, Ill. 60091

Original No. 3,126,681, dated Mar. 31, 1964, Ser. No. 78,893, Dec. 28, 1960. Application for reissue Oct. 16, 1964, Ser. No. 418,365
Int. Cl. B65b *43/08, 31/04*
U.S. Cl. 53—30 24 Claims

Matter enclosed in heavy brackets [ ] appears in the original patent but forms no part of this reissue specification; matter printed in italics indicates the additions made by reissue.

Packing machines in which film is drawn into a cup to form a pocket in which the article to be packaged is inserted have been extensively used. Usually these cups have been carried by a drum, so that they followed a circular path. Ordinarily the open face of the cup has been covered and sealed by another layer of plastic. While drawing the film into a cup it has been necessary heretofore to grip the edge of the film. One feature of the present invention is in providing a surface at the side of the cup to which the film, perhaps with suitable treatment such as heat, will cling enough to resist sidewise pull so that it will not need to be gripped. This is especially desirable if the drums are to follow a straight line because clamping means cannot then be as simple as around a drum.

There are some packagers who greatly prefer to have the packaging follow a straight line or horizontal path. In that event, a wide space, representing a substantial length of travel, can be provided for filling the pockets after they have ben formed, the pockets remaining level throughout the filling zone.

Straight-line packaging has also been commonly practiced, where the film or other material could be drawn along a table and after articles had been set thereon the sides folded up and over the top, with subsequent severing and end closing. The wide space available for placing the packages has been one of the recognized merits of this type of packaging, but in other respects it has not been nearly as desirable as packaging in which film is drawn into cups.

According to the present invention the advantages of both methods of packaging are attained. The cups are articulated and moved along as an endless chain, all of the packaging being accomplished along the upper reach. This permits the filling space to be as wide as may be desired. Perhaps it would seem that this means of accomplishing the advantages of cup packaging and straight-line packaging would have occurred to someone before. Of course, it may be that it did, but that the problem of applying vacuum to the cups in straight-line movement discouraged any further contemplation of using articulated cups. However, the problem of supplying vacuum to the cups has been solved according to this invention, and in its preferred form it even includes means for vacuum packing, in which the package is substantially evacuated before final sealing.

The application of vacuum to moving cups on a drum is fairly simple. It is merely necessary to connect a tube from each cup to a central self-valving head in which a port for each cup rotates with the drum and at the proper times moves across a port or manifold connected to the suction pump. It is apparent that this simple method of connecting the suction pump to the successive arcticulated cups moving in a straight line is hardly suitable. According to the present invention, the problem is solved by making a temporary connection between the suction line and each cup, and placing a valve on the port of the cup so that once the suction is drawn it will be more or less held by the valve. To provide a wide filling area with the film held down into the cup throughout the length of the run through this area, a succession of temporary connections may be made with each cup so that even if there should be a small leak, the film will not draw away from the walls of the cup.

In making possible the straight line movement of suction cups, further simplifications become possible. For example a succession of operations can be performed with a succession of heads carried by one carriage reciprocating vertically.

Various details have had to be contrived in order to work out the straight line feature, as well as working out other features of the invention. These and other advantages and objects of the invention will be apparent from the following description and from the drawings, which are largely diagrammatic, with parts often omitted for simplification of illustration.

Designation of Figures

FIGURE 1 is a side view of the form of the invention chosen for illustration.

FIGURE 2 is a partially diagrammatic view showing the successive operating heads on a common vertically reciprocating carriage, with some variations as compared to the other figures.

FIGURE 2A is a detailed view of quick-relief mechanism for relieving the vacuum quickly when desired.

General Description

Figure 3:
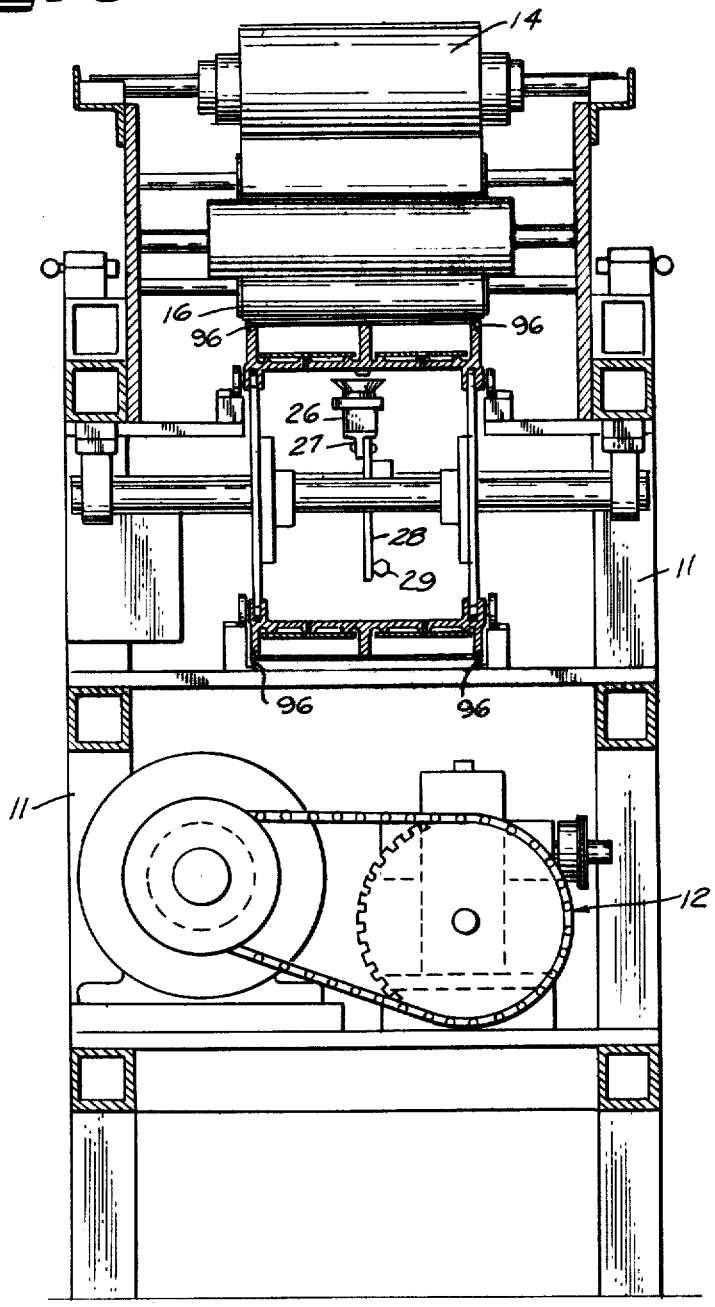
FIGURE 3 is a view taken from the left end of FIG. 1, with some parts shown in section more or less on the line 3—3 of FIG. 1.

Although the following disclosure offered for public dissemination is detailed to ensure adequacy and aid understanding this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

As seen in FIG. 1 the machine is carried by a frame 11 and is driven by a motor and gear combination 12. A series of cups 13 articulated together in the form of an endless chain moves from left to right along the top of the machine. As seen best in FIG. 4, a first film 14 is drawn from a roll 14', and after winding around enough rolls to ensure its being maintained flat is passed around a heating roll which makes it stretchable. This may be roll 16 which applies it over the cups 13, or the roll immediately preceding it. The cups are moved intermittently, and at each stop approaching and passing filling station 17, a suction head or coupler 18 and 19 is raised into engagement with the cups 13 to suck the film down into the cups or hold it there. Objects 21 are set in the pockets 22 of the film thus formed and thereafter a second film 23 from a roll 23' is applied over the pockets, thereby sealing them. Other operations to be described may then be performed on the package to evacuate it if desired, seal it more firmly, cut it from the continuous films, and deliver it to a conveyor 24.

Pocketing suction

Figures 4, 5, 6:
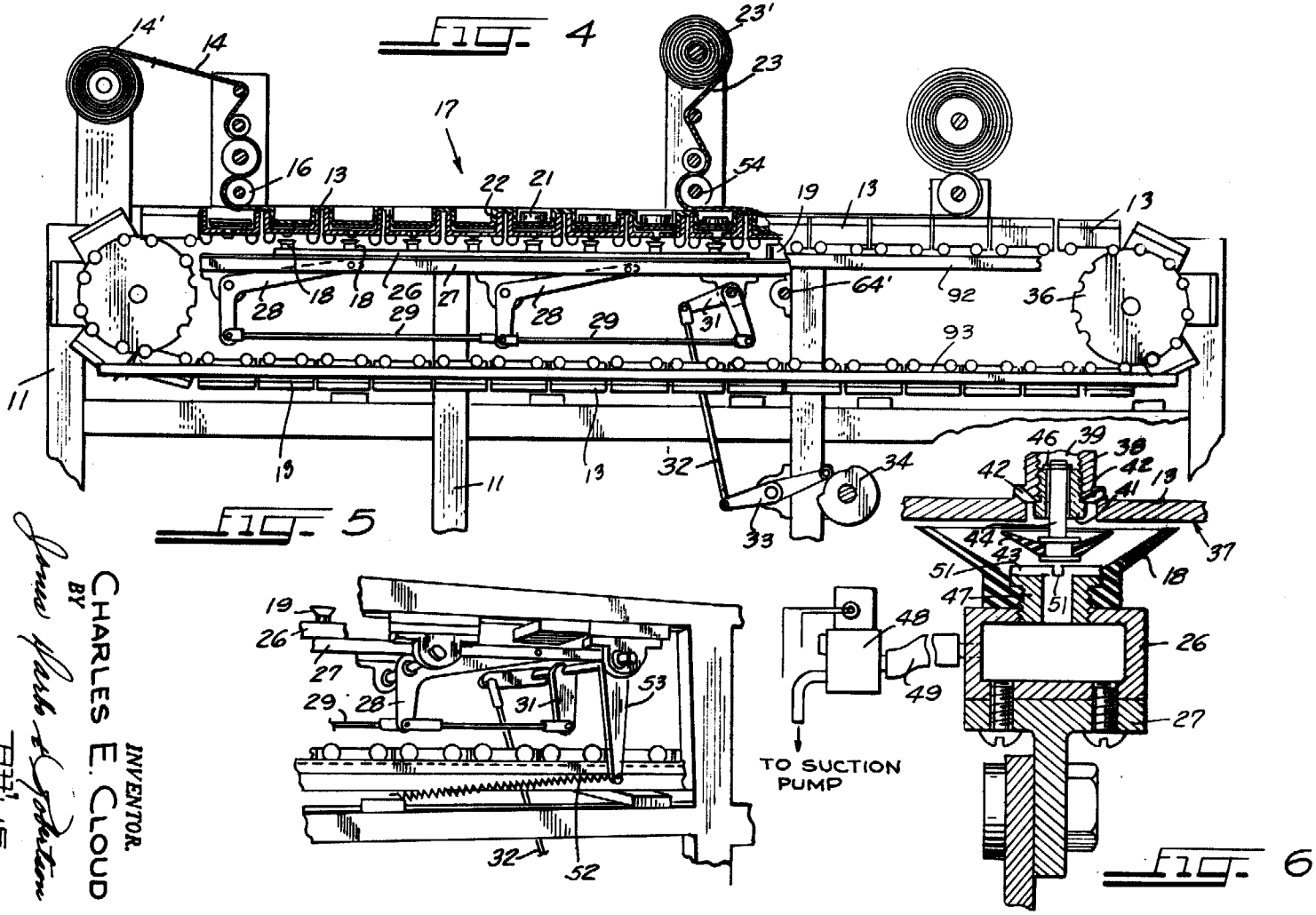
FIGURE 4 is a longitudinal sectional view of the apparatus of FIG. 1 showing especially the endless chain of articulated cups, some of which are shown in section, and showing the means for applying vacuum to them.
FIGURE 5 is a more detailed view showing especially some of the actuating linkage for the vacuum applying means.
FIGURE 6 is a view on a larger scale showing a cross section of the vacuum manifold and associated vacuum applying parts.

The suction couplers 18 and 19 are carried by suction manifold 26, the cross section of which is seen better in FIG. 6. The suction manifold 26 may be carried by a T beam 27 which in effect forms a flange on the suction manifold 26. The suction manifold 26 with its flange 27 are raised and lowered by bell crank levers 28 which are actuated by connecting rods 29, bell crank lever 31, connecting rod 32, cam follower lever 33, and cam 34. The cam 34 makes one revolution for each step of movement of the chain of cups 13, being rotated in unison with the continuously moving portion of a Geneva-drive mechanism which drives the sprockets 36 by which the chain of cups 13 is advanced a step at a time.

Figure 8:
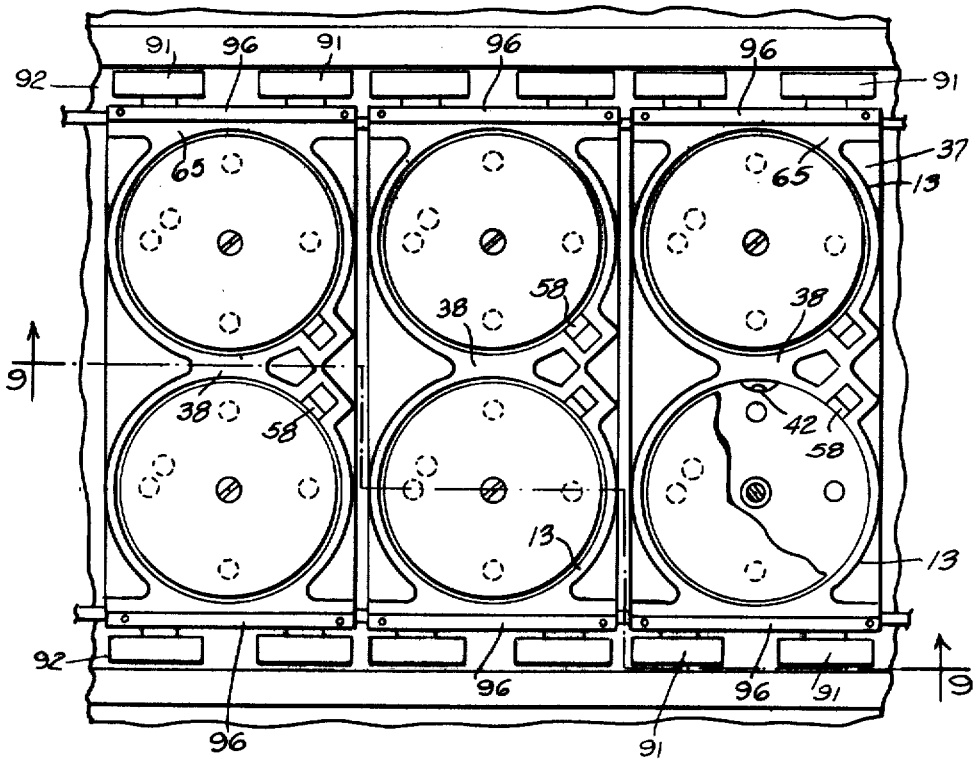
FIGURE 8 is a view looking down on a group of the articulated cup plates.
Figure 9:
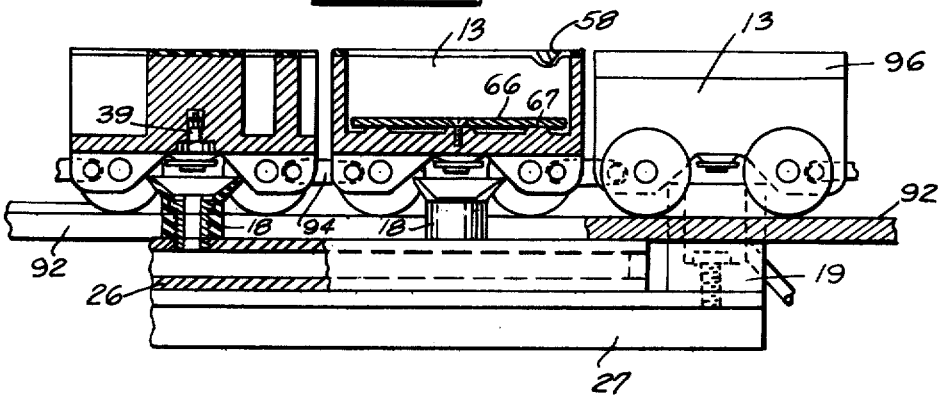
FIGURE 9 is a vertical sectional view taken approximately on the irregular line 9—9 of FIG. 8.

As seen in FIG. 8, the cups 13 move in pairs, two cups side by side, being formed by one cup plate 37. The two cups are separated by a common wall portion 38. As seen in FIGS. 6 and 9, a bore or recess 39 extends upwardly in the center of the wall 38. A fragmentary transverse section of the wall 38 is seen in FIG. 6, which also shows a bushing 41 screwed into the bore 39. Passages 42 lead from the space surrounding the head of bushing 41 to the inside of each cup 13.

A valve 43 in the form of a rubber cup is carried by stem 44 which extends through bushing 41 and terminates in a head 46 above the bushing which limits the downward movement of valve cup 43. Thus each cup plate 37 carried its own valve cup 43.

The suction couplers 18 are also formed of rubber. Each suction coupler 18 is secured to suction manifold 26 by a bushing 47. When the suction manifold 26 is raised, the cups 13 at that time being stationary, a suction coupler 18 is pressed against the bottom of plate 37 sealing itself to the plate around the valve cup 43. Just as it reaches sealing position a solenoid valve 48 is actuated to connect manifold 26 to a vacuum pump by flexible hose 49. This causes air to be drawn from both of the cups 13, this air being drawn past the flexible edge of valve cup 43. As the air is drawn from the cups 13 in the first instance, the film is drawn down into the cups. The successive couplers cooperate with the valves to make certain that the film is held in the cups, the valves holding the vacuum in the cups 13 while they move and the couplers sucking out any slight amounts of air which may enter the cups under the film as the cups move between successive stops.

The suction couplers 18 preferably hold the valve cups 43 resting lightly on the cup plate 37 so that no air will enter cups 13 when the suction couplers 18 are removed or vented. Preferably suction manifold 26 is vented to the atmosphere by release of solenoid valve 48 just before the suction coupler 18 is to be lowered. The returning air presses the valve cup 43 firmly against the bottom of cup plate 37 effectuating a good seal. To be sure that valve cup 43 does not obstruct the passage through the bushing 47, its head is provided with slots 51. In FIG. 5 a spring 52 has been shown which, through lever arm 53, tends to pivot the bell crank levers 28 in a direction to lower the suction manifold 26. This will pull the suction manifold 26 away from the cup plates 37. It may be omitted, however, when the valve 48, is, as illustrated, one which alternatively connects suction manifold 26 to a vent. When it is well vented the suction heads 18 will drop away from plate 37 by the weight of the parts. Manifold 26 must of course be lowered far enough so that cup valve 43 may clear it as the cup plate 37 moves to the next position.

Preferably the clevis fitting on at least one end of each of the connecting rods 29 and 32 is threaded to the connecting rod so that it may be adjusted to give proper action of the parts and to raise the suction manifold 26 just the right amount to press the suction couplers 18 reliably against the plates 37. If desired, the two end suction heads, one of which is represented by 19, may be of firmer construction so as to limit the upper movement of suction manifold 26. This is not believed to be necessary, however, and coupler 19 is different for another reason described below. The second film 23 is heated as by a hot drum 54 and applied over the cups 13, thus completing the package, although further steps may be taken.

Vacuum packing

The air may now be withdrawn from the cups 13 if vacuum packing is desired. To this end, a carriage 56 is lowered by slide rods or legs 57 each time the cups come to rest. As each cup makes its first stop after application of the second film 23 to it, a heated piercing tip 55 pierces the upper film to let the air be drawn out from the package. The piercing tip 55 moves downwardly through the upper film 23 into a shallow recess or evacuating spout 58 extending outwardly from the cup 13. The first film 14, in being drawn down into the cups 13 will also be drawn down into a shallow depression which produces the spout 58, so that this part of the first film 14 will not be engaged by the second film 23.

After the piercing, the cups move on and at their next stop, a high-suction head 59 is lowered upon them. The high-suction head 59 is connected by hose 61 through a solenoid valve to a high-vacuum pump. This draws the air from the inside of the package within the cup 13 out through the spout and the small hole that will have been formed in the upper film 23 over the spout 58 by tip 55.

At the same time, as taught in my prior patent, No. 2,888,787, high vacuum should be applied on the underside of the first film drawn into the cup. This is to keep the package from collapsing until nearly all the air has been drawn from the inside of the package. When it has been, as taught by said patent it is preferable that the under vacuum be vented while the upper vacuum continues to be applied. To this end, the T bar or T beam 27 (or, for convenience, manifold 26) may carry a high vacuum coupler 19, which may be similar to suction couplers 18, or may be a rubber body somewhat less soft. Preferably this high vacuum coupler does not thrust the valve cup 43 upwardly but lets it hang as far as the head 46 will permit. Then when the suction in the suction coupler 19 is vented, the air can rapidly enter the cup 13.

As a matter of fact, it is desirable to let the air enter the cups 13 at this stage even more quickly than is likely to result by venting this suction coupler 19. To this end, each cup plate 37 is provided with a quick-acting venting valve. Thus a fitting in the form of an elbow 60 may extend through the bottom wall of one of the cups 13, this elbow 60 normally being sealed by a hinged plate 62 having a rubber face 63. At the instant when quick venting is desired, a rotating segment 64 strikes the valve plate 62 and opens it to admit air through the fitting 60 to the cup into which it leads, from which it also flows to the companion cup through the apertures 42 of FIG. 6. Segment 64 is carried by a shaft 64' rotating about a fixed axis one revolution per step of cups 13, in timed relation to the other parts.

To ensure rapid movement of air from the cups 13, and back into them when desired, it is preferred that a plate 66 be secured in each of the cups 13 to form the effective bottom thereof. Lugs 67, which may be formed in the true bottom of the cup 13, or may be formed on plates 66, keep the plate 66 raised so that air can flow into the effective portion of the cup all around the periphery of the plate 66. The plate 66 should fit fairly closely at its periphery but should have adequate clearance for air flow.

As explained in the prior patent mentioned, the venting of the vacuum below the lower film 14 while the suction is maintained above the package causes a collapsing of the package about the article wrapped therein so that the package clings very tightly to the article. As this collapse is completed, the spout formed by vent 58 in FIG. 8 is also collapsed. That is, the lower film is closed against the upper film. This closes the hole which was pierced in the upper film and prevents air from returning to the package when the upper vacuum is vented and the vacuum head 59 removed.

Weld sealing

Although the films cling together well enough to stay sealed with fairly gentle handling, it is possible with some film materials that violet handling such as twisting them would separate the films and let air into the package. Inasmuch as this might cause spoilage of food products, and would certainly remove some advantages of vacuum packaging, it is important that this be avoided. Accordingly, the entire periphery of the package including the spout area is preferably weld sealed.

To this end a head 69 is lowered by carriage 56 onto the cups 13 at their next stop. The head 69 is heated by an electric heater 70 to a temperature which will produce weld sealing of the plastic films (assuming that they are heat sealable), and includes a small knob 71 fitting neatly into each depression 58 of FIG. 8 so as to press the films together firmly at that point as well as all around the periphery of each cup. The head 69 is preferably in the form of an inverted cup so that there will be no possibility that the package would block the downward movement of the heads, which may bear against "Silastic" faces 65 on the cups.

Cut-off heads

Usually it is desired to sever the packages from the films which up to this point have held them in one continuous strip. To this end a cut-off head 72 may be lowered by frame 56 onto the cups at their next stop. Or, as seen in FIG. 2, there may be an intermediate cooling position. This head may comprise merely a fairly sharp metallic edge, a knife edge, extending around the peripheries of the cups, including into the grooves 58, to sever each package all around its periphery. As mentioned, the rims of the cups 13 are faced with a silicone type of elastomer, such as "Silastic" against which the knife edge may press. The head 72 is preferably heated.

The cut material is preferably wound on a drum 73, which is driven by a belt 74. The belt 74 preferably is driven only when the cups 13 are advanced, but inasmuch as it preferably includes friction slip features, it can be driven constantly. The friction drive accommodates the movement of the drum 73 to its increasing diameter as the scrap is wound thereon.

The straight line movement of the suction cups makes it practical to mount the various heads and operating devices just described on one carriage, reciprocating vertically toward and from the path of the cups. As carriage 56 moves vertically as described, the piercing tip 55, the high suction head 59, the weld sealing head 69, and the cut-off head 72 cooperate in succession with each cup 13.

Each of the heads is carried by one or more cross-bars 75 of the carriage 56, and is resiliently yieldable. For example, the head 59 is urged downwardly from cross-bar 75 by the springs 76, the downward movement being limited by adjustable collars 77 on rods 78, which slide through cross-bar 75. As each head comes to rest upon the pair of cups 13, with which it is to engage, the springs 76 yield to permit the carriage to move further downwardly slightly, while the head engages the cups with just the right pressure, determined by the springs 76. Alternatively the heads may be mounted rigidly on a cross bar which is yieldably mounted, as by being slideable on pins 80 carried by carriage 56, and being urged downwardly by springs 81 against the carriage.

The carriage 56 may be carried by slide-rods 57, which may be rigidly secured together to serve as a frame with all of the rods 57 operating in unison. With the small number of machines which have been manufactured so far, it has been found convenient to be able to adjust the stopping position of the carriage in its downward movement. This has been accomplished by having the carriage 56 biased downwardly and raised by cams. The stopping position is then easily determined by adjusting screw legs 82, which may come to rest on any suitable fixed portion of the structure. The piercing tip 55 may be rigidly mounted on carriage 56.

Discharge of packages

Although the packages may be dumped from the cups, lift out devices have been illustrated and have the advantages of handling the packages more gently, more uniformly and reliably, with the packages all right side up. A discharge arm 83 is actuated each time a cup comes to rest adjacent it. The discharge arm 83 carries suction cups 84 connected to one of the sources of vacuum at appropriate times. After seizing the package by vacuum, the discharge arm 83 is swung clockwise and passes through slots in a sloping plate 85. The plate 85 strips the package from the arm 83 and the package slides on to conveyor 24. The arm 83 then returns for the next package, or rather the next pair of packages.

Drive and control means

Figure 7:
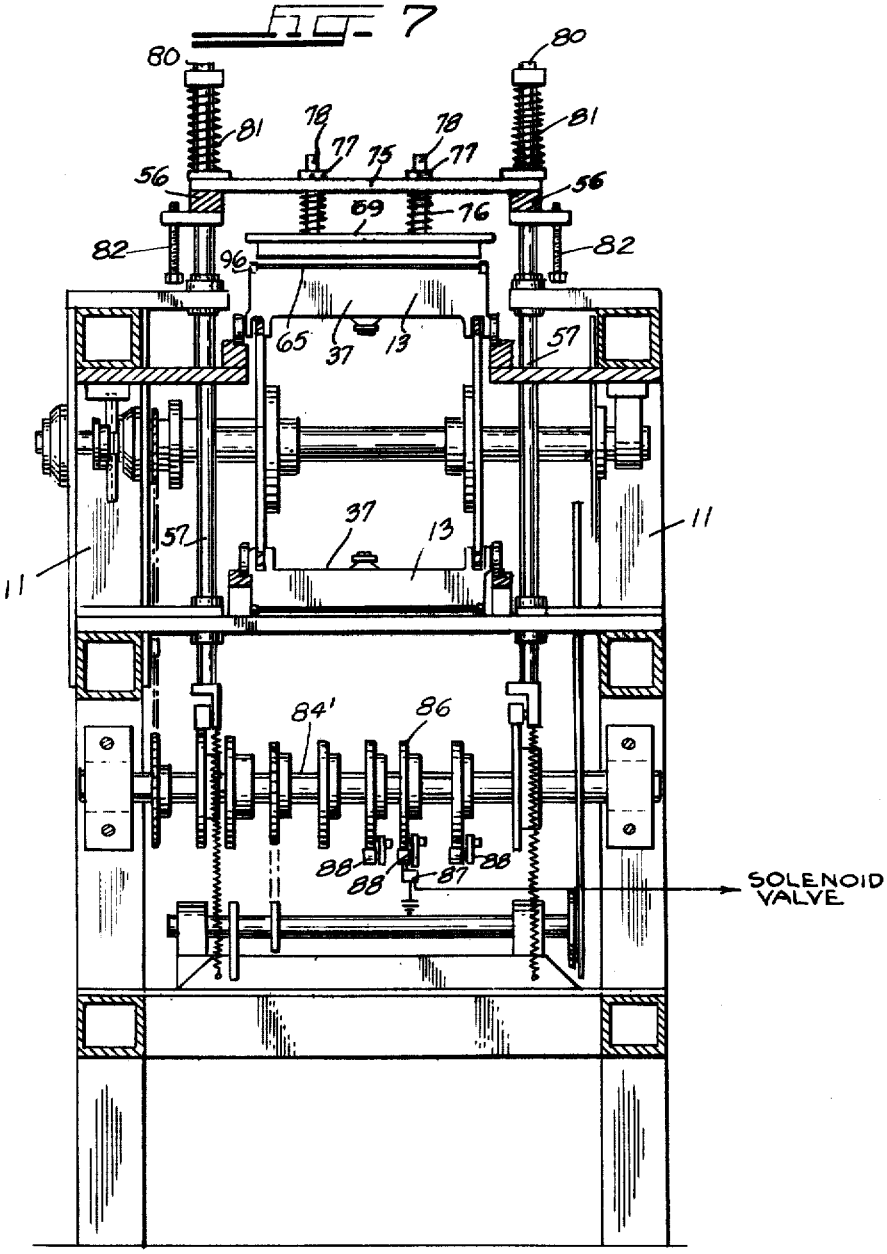
FIGURE 7 is a transverse sectional view looking from the left in FIG. 1 and taken largely along the lines 7—7 of FIG. 1.

Although some parts of the drive and control means have been illustrated, particularly in FIGS. 1 and 7, the previous discussion makes clear the type of drive and control needed so that a good machine designer could supply these details. The drawings show quite a few parts of the drive and control means as they have been actually built. As seen in FIG. 1 the motor and gear box combination 12 (seen separately in FIG. 3) drives a shaft 84' which, as illustrated in FIG. 7, may carry an assortment of sprockets and the cams for driving or controlling of the parts of the apparatus. It is desirable to keep the vacuum lines as short as possible, especially beyond the control valves from the suction pump. Accordingly, vacuum control cams such as cam 86 of FIG. 7 will operate a switch 87 (perhaps through a cam follower 88) for controlling a solenoid valve such as the valve 48 (in FIG. 6) as close as practicable to the point of application of the vacuum.

Cup tracks

As seen best in FIG. 8, each cup plate 37 carries and is carried by four rollers 91. These ride on track bars 92, when moving to the right in FIG. 4, and 93 when moving to the left in FIG. 4. The track bar 92 maintains the cups in a truly stright line, nonsagging movement, during their useful run. The track bar 93 supports the cups during their return run mainly to relieve the various parts, such as connecting links 94 (FIG. 9), of wearing strain.

Cling-holding of edges

Some means must be provided for holding the film 14 stretched across the cups while the suction draws the film down into the cups. Heretofore, clamping means have been provided, on drum type machines. With straight line movement, clamping becomes difficult. The substitute here devised has proved so adequate in spite of its simplicity that it will probably be used on drum machines too. It is made possible by realizing that resistance to side-wise pull is all that is necessary.

As seen in FIG. 8, the illustrated form of the invention includes cling strips 96 extending along opposite sides of each plate 37, for the full length of these sides. These may be tacky if necesary, but with most films it is merely necessary that the top surface of these strips be either highly polished or of a material having a clinging affinity for the film in its heated condition. Polyvinyl chloride has been used when the film surface was rubber hydrochloride. Saran and polished stainless steel would also be suitable. The film is pressed firmly on the strips, as well as on the peripheries of the cups, by roll 16. There is sufficient drag on supply roll 14' or elsewhere as the film approaches the cups so that the film will not slip lengthwise forwardly under influence of the suction. It is prevented from slipping rearwardly by the clinging action all along the series of cups and by being held in the more advanced cups as the film is first drawn into each successive cup. In feeding a new film it may be desirable to run it without suction until it has passed beyond the point of applying the second film by heated roller 54, as this roller will initially help to hold the sheet against being pulled backwards by suction.

The securing of the edges without clamping means has been found so advantageous that even less convenient forms than that illustrated might be restored to in the future if necessary.

It will be observed that the principle of using the clinging action of the web 14 to the cling-surfaces 96, though most useful in the type of operation here indicated, has wide possible applications. For example, where cups are not involved, belts or other laterally disposed strips can be used for carrying through any type of machine a web, the edges of which have been pressed against such strips, assuming that the web and the surfaces of the strips have this surface clinging action. Likewise, pieces which are separate when applied or severed after application can be separately handled by any suitable surface with which they have this clinging action. In any event, after some operation has been performed with the sheetlike material thus handled, performing some change on the material or merely applying it to something else, the material can be separated from the carrying surface to which it has been clinging merely by overcoming the unchanged clinging force. Although it is old to carry items by means of magnetic attraction, application to adhesive coated plates, and by suction, this use of the surface clinging action here contemplated between adhesive-free non-magnetic clinging surfaces is believed to be broadly new.

Although some of the claims specify the location of the clinging surfaces as being opposite to one another, this condition is, of course, found when an entire periphery is of clinging nature. Also, some of the claims do not even require that there be opposite surfaces.

I claim:

1. Packaging apparatus including in combination:

a plurality of mold cups linked together in the form of an endless chain, each having a suction passage extending from deep in the cup to an opening exposed externally of the cup;

means for moving the cups with step-by-step movement to pass around spaced parallel generally horizontal axes;

means for guiding the upper run of cups along a generally straight and horizontal path passing a filling station;

means for applying a web of stretchable material across the cups as they approach said station;

said apparatus including means for restraining the sides of the web against lateral movement while stretched into said cups;

means including a succession of thrust-applied separable couplers for connecting a suction pump to the suction passages of successive cups in successive positions as they successively stop along said path for drawing air from the cups, thereby forming pockets in the web;

valves carried by the cups associated with the suction passages for preventing the return of air to the pockets when said last name means is separated from the cups during movement of the cups;

means for applying a second web across the cups after they have passed the filling station;

a carriage moveable downwardly toward and upwardly from said cups along a part of said path beyond the point of applying the second web thereto;

a succession of operating devices carried by said carriage at positions to cooperate with successive cups at successive stopped positions thereof as the carriage moves downwardly; and means to move the carriage downwardly to cause said devices to cooperate successively with the cups in successive positions.

2. Packaging apparatus including in combination:

a plurality of mold cups linked together in the form of an endless chain, each having a suction passage extending from deep in the cup to an opening exposed externally of the cup;

means for moving the cups to pass around spaced parallel generally horizontal axis;

means for guiding the upper run of cups along a generally straight and horizontal path passing a filling station;

means for applying a web of stretchable material across the cups as they approach said station;

said apparatus including means for restraining the sides of the web against lateral movement while stretched into said cups;

means including a succession of thrust-applied separable couplers for connecting a suction pump to the suction passages of successive cups in successive positions along said path for drawing air from the cups, thereby forming pockets in the web; and means for applying a second web across the cups after they have passed the filling station.

3. Packaging apparatus according to claim 2 including also suction lift-out means mounted to move towards said cups as the cups are in a downwardly moving location, and to move arcuately away from the cups; and stationary fingers past which the suction lift-out means pass, and which separate the lifted out package from the suction lift-out means, and along which the package slides for further handling.

4. Packaging apparatus including in combination:

a plurality of suction cups linked together in the form of an endless chain, each having a suction passage extending from deep in the cup to an opening exposed externally of the cup;

means for moving the cups to pass around spaced parallel generally horizontal axes;

means for guiding the upper run of cups along a generally straight and horizontal path passing a filling station;

means for applying a web of stretchable material across the cups as they approach said station;

said apparatus including means for restraining the sides of the web against lateral movement while stretched into said cups;

means including a succession of thrust-applied separable couplers for connecting a suction pump to the suction passages of successive cups in successive positions along said path for drawing air from the cups, thereby forming pockets in the web;

valves carried by the cups associated with the suction passages for preventing the return of air to the pockets when said last named means is separated from the cups;

means for applying a second web across the cups after they have passed the filling station;

a carriage moveable downwardly toward and upwardly from said cups along a part of said path beyond the point of applying the second web thereto;

a succession of operating devices carried by said carriage at positions to cooperate with successive cups at successive positions thereof as the carriage moves downwardly; and means to move the carriage downwardly to cause said devices to cooperate successively with the cups in successive positions.

5. Packing apparatus including in combination:

a plurality of suction cups linked together in the form of an endless chain, each having a suction passage extending from deep in the cup to an opening exposed externally of the cup;

means for moving the cups with step-by-step movement to pass around spaced parallel generally horizontal axes;

means for guiding the upper run of cups along a generally straight and horizontal path passing a filling station;

means for applying a web of stretchable material across the cups as they approach said station;

said apparatus including means for restraining the sides of the web against lateral movement while stretched into said cups;

means including a succession of thrust-applied separable couplers for connecting a suction pump to the suction passages of successive cups in successive positions as they successively stop along said path for drawing air from the cups, thereby forming pockets in the web; and valves carried by the cups associated with the suction passages for preventing the return of air to the pockets when said last named means is separated from the cups during movement of the cups.

6. Packaging apparatus including in combination:

a plurality of suction cups linked together in the form of an endless chain, each having a suction passage extending from deep in the cup to an opening exposed externally of the cup;

means for moving the cups to pass around spaced parallel generally horizontal axes;

means for guiding the upper run of cups along a generally straight and horizontal path passing a filling station;

means for applying a web of stretchable material across the cups as they approach said station;

said apparatus including means for restraining the sides of the web against lateral movement while stretched into said cups;

means including a succession of thrust-applied separable couplers for connecting a suction pump to the suction passages of successive cups in successive positions along said path for drawing air from the cups, thereby forming pockets in the web; and valves carried by the cups associated with the suction passages for preventing the return of air to the pockets when said last named means is separated from the cups.

7. Packaging apparatus including in combination:

a plurality of suction cups linked together in the form of an endless chain, each having a suction passage extending from deep in the cup to an opening exposed externally of the cup;

means for moving the cups to pass around spaced parallel generally horizontal axes;

means for guiding the upper run of cups along a generally straight and horizontal path passing a filling station;

means for applying a web of stretchable material across the cups as they approach said station;

said apparatus including means for restraining the sides of the web against lateral movement while stretched into said cups;

means including a succession of thrust-applied separable couplers for connecting a suction pump to the suction passages of successive cups in successive positions along said path for drawing air from the cups, thereby forming pockets in the web;

valves carried by the cups associated with the suction passages for preventing the return of air to the pockets when said last named means is separated from the cups; and said means for connecting the suction pump including a manifold extending longitudinally of the path of movement and connected to the suction pump, the couplers being cuplike, formed of elastomer material, carried by the manifold outside thereof, facing said path, and having openings therethrough communicating with the manifold.

8. Packaging apparatus including in combination:

a plurality of suction cups linked together in the form of an endless chain, each having a suction passage extending from deep in the cup to an opening exposed externally of the cup;

means for moving the cups to pass around spaced parallel generally horizontal axes;

means for guiding the upper run of cups along a generally straight and horizontal path passing a filling station;

means for applying a web of stretchable material across the cups as they approach said station;

said apparatus including means for restraining the sides of the web against lateral movement while stretched into said cups;

means including a succession of thrust-applied separable couplers for connecting a suction pump to the suction passages of successive cups in successive positions along said path for drawing air from the cups, thereby forming pockets in the web;

valves carried by the cups associated with the suction passages for preventing the return of air to the pockets when said last named means is separated from the cups;

said means for connecting the suction pump including a manifold extending longitudinally of the path of movement and connected to the suction pump, the couplers being cuplike, formed of elastomer material, carried by the manifold outside thereof, facing said path, and having openings therethrough communicating with the manifold; and means for oscillating a manifold to bring each coupler into engagement with successive cups.

9. Packaging apparatus including in combination:

a plurality of suction cups linked together in the form of an endless chain, each having a suction passage extending from deep in the cup to an opening exposed externally of the cup;

means for moving the cups to pass around spaced parallel generally horizontal axes;

means for guiding the upper run of cups along a generally straight and horizontal path passing a filling station;

means for applying a web of stretchable material across the cups as they approach said station;

said apparatus including means for restraining the sides of the web against lateral movement while stretched into said cups;

means including a succession of thrust-applied separable couplers for connecting a suction pump to the suction passages of successive cups in successive positions along said path for drawing air from the cups, thereby forming pockets in the web;

valves carried by the cups associated with the suction passages for preventing the return of air to the pockets when said last named means is separated from the cups;

said means for connecting the suction pump including a manifold extending longitudinally of the path of movement and connected to the suction pump, the couplers being cuplike, formed of elastomer material, carried by the manifold outside thereof, facing said path, and having openings therethrough communicating with the manifold;

means for oscillating a manifold to bring each coupler into engagement with successive cups;

electrically controlled valve means close to the manifold for controlling its connection to the suction pump; and means for controlling the valve means in timed relationship to the engagement of the couplers with the cups.

10. Packaging apparatus including in combination:

a plurality of suction cups linked together in the form of an endless chain, each having a suction passage extending from deep in the cup to an opening exposed externally of the cup;

means for moving the cups to pass around spaced parallel generally horizontal axes;

means for guiding the upper run of cups along a generally straight and horizontal path passing a filling station;

means for applying a web of stretchable material across the cups as they approach said station;

said apparatus including means for restraining the sides of the web against lateral movement while stretched into said cups;

means including a succession of thrust-applied separable couplers for connecting a suction pump to the suction passages of successive cups in successive positions along said path for drawing air from the cups, thereby forming pockets in the web;

valves carried by the cups associated with the suction passages for preventing the return of air to the pockets when said last named means is separated from the cups; and the means for restraining the sides of the web comprising strips against which the sides of the web are pressed and to which the web clings to resist lateral movement.

11. Packaging apparatus according to claim 2 in which:

said cups have vents formed in their rims to produce in communication with the pockets a vent spout for each pocket in the web drawn into the cups;

one of said devices including means for puncturing the second web in the part thereof covering said spout; and another of said devices comprising a suction head for drawing air through the punctured web and spout to evacuate the package.

12. Packaging apparatus according to claim 2 in which:

said cups have vents formed in their rims to produce in communication with the pockets a vent spout for each pocket in the web drawn into the cups;

one of said devices including means for puncturing the second web in the part thereof covering said spout;

another of said devices comprising a suction head for drawing air through the punctured web and spout to evacuate the package; and another of the devices comprising means for thereafter weld sealing the two webs together throughout the peripheries surrounding the successive pockets, including the spout portions of such peripheries.

13. Packaging apparatus according to claim 2 in which:

said cups have vents formed in their rims to produce in communication with the pockets a vent spout for each pocket in the web drawn into the cups;

one of said devices including means for puncturing the second web in the part thereof covering said spout;

another of said devices comprising a suction head for drawing air through the punctured web and spout to evacuate the package;

another of the devices comprising means for thereafter weld sealing the two webs together throughout the peripheries surrounding the successive pockets, including the spout portions of such peripheries;

said apparatus including a passage for venting freely to the atmosphere the space in said cups below the pocketed web during the later part of the operation of the suction head in evacuating the package;

a valve for said passage biased to the closed position; and means at a fixed location but rotating in timed relation with the movement of the cups to flip open the valve associated with the cup in which the package is being evacuated.

14. Packaging apparatus including:

a series of cups, each having a suction passage therein for the suction of air from the cups;

means for moving the cups;

means for applying a web of stretchable material across the cups;

means for connecting a suction pump to the passages for drawing the web into the cups;

said cups being provided with cling-surfaces laterally disposed on opposite sides of the cups with respect to the direction of cup movement, adapted to cling to a nontacky film and restrain the portions of the web laterally of the cups from lateral movement as the web is drawn into the cups.

15. Packaging apparatus including:

a series of cups, each having a suction passage therein for the suction of air from the cups;

means for moving the cups;

means for applying a web of stretchable material across the cups;

means for connecting a suction pump to the passages for drawing the web into the cups;

said cups being provided with cling-surfaces laterally disposed on opposite sides of the cups with respect to the direction of cup movement, adapted to cling to a nontacky film and restrain the portions of the web laterally of the cups from lateral movement as the web is drawn into the cups;

said cling-surfaces being positioned to have the web pressed against them by the means for applying the web across the cups.

16. Packaging apparatus including:

a series of cups, each having a suction passage therein for the suction of air from the cups;

means for moving the cups;

means for applying a web of stretchable material across the cups;

means for connecting a suction pump to the passages for drawing the web into the cups;

said cups being provided with cling-surfaces laterally disposed on opposite sides of the cups with respect to the direction of cup movement, adapted to cling to a nontacky film and restrain the portions of the web laterally of the cups from lateral movement as the web is drawn into the cups;

said cling-surfaces being positioned to have the web pressed against them by the means for applying the web across the cups; and means for pulling the edge portions of the web away from the cling-surfaces in a direction toward which they face.

17. Packaging apparatus including:

a plurality of suction cups linked together in the form of an endless chain, each having a suction passage extending from deep in the cup to an opening exposed externally of the cup;

means for moving the cups with step-by-step movement to pass around spaced parallel generally horizontal axes;

means for guiding the upper run of cups along a generally straight and horizontal path passing a filling station;

means for applying a web of stretchable material across the cups as they approach said station;

said apparatus including means for restraining the sides of the web against lateral movement while stretched into said cups;

means including a succession of couplers for connecting suction means to the suction passages of successive cups in successive positions, as they successively come to the means, for drawing air from the cups, thereby forming pockets in the web;

valves carried by the cups associated with the suction passages for preventing the return of air to the pockets when said last named means is separated from the cups during movement of the cups; said valves being biased toward their open positions, and the first of said couplers operating to bias each valve, as the coupler cooperates therewith, toward the closed position; the final coupler restoring each valve to its normal bias so that when said final coupler so permits, air can enter the associated cup through said passage.

18. Packaging apparatus including:

a plurality of suction cups linked together in the form of an endless chain, each having a suction passage extending from deep in the cup to an opening exposed externally of the cup;

means for moving the cups with step-by-step movement to pass around spaced parallel generally horizontal axes;

means for guiding the upper run of cups along a generally straight and horizontal path passing a filling station;

means for applying a web of stretchable material across the cups as they approach said station;

said apparatus including means for restraining the sides of the web against lateral movement while stretched into said cups;

means including a succession of couplers for connecting suction means to the suction passages of successive cups in successive positions, as they successively come to the means, for drawing air from the cups, thereby forming pockets in the web;

valves carried by the cups associated with the suction passages for preventing the return of air to the pockets when said last named means is separated from the cups during movement of the cups; said valves and couplers being constructed for differential coaction, the valves preventing re-entry of air after application of the first coupler, but permitting reentry of air after application of the final coupler.

19. Packaging apparatus including:

a plurality of suction cups linked together in the form of an endless chain, each having a suction passage extending from deep in the cup to an opening exposed externally of the cup;

means for moving the cups to pass around spaced parallel generally horizontal axes;

means for guiding the upper run of cups along a generally straight and horizontal path passing a filling station;

means for applying a web of stretchable material across the cups as they approach said station;

said apparatus including means for restraining the sides of the web against lateral movement while stretched into said cups;

means including a coupler for connecting a suction pump to the suction passages of successive cups, as they successively come to this means, for drawing air from the cups, thereby forming pockets in the web; and valves carried by the cups associated with the suction passages for preventing the return of air to the pockets when said coupler is separated from the cups.

20. Packaging apparatus including:

a plurality of suction cups linked together in the form of an endless chain, each having a suction passage extending from deep in the cup to an opening exposed externally of the cup;

means for moving the cups to pass around spaced parallel generally horizontal axes;

means for guiding the upper run of cups along a generally straight and horizontal path passing a filling station;

means for applying a web of stretchable material across the cups as they approach said station;

said apparatus including means for restraining the sides of the web against lateral movement while stretched into said cups;

means including a coupler for connecting a suction pump to the suction passages of successive cups, as they successively come to this means, for drawing air from the cups, thereby forming pockets in the web; and valves carried by the cups associated with the suction passages for preventing the return of air to the pockets when said coupler is separated from the cups; said valves being biased toward their open positions, and said coupler operating to bias each valve, as the coupler cooperates therewith, to closed position.

21. Packaging apparatus including:

a cup having a suction passage therein for the suction of air from the cup;

means for connecting a suction pump to the passages for drawing into the cup a sheet stretched across the cup;

said cup being provided with cling-surfaces on opposite sides of the cup, adapted to cling to a nontacky film and restrain the portions of the sheet beyond the cup from movement toward the cup as the sheet is drawn into the cup, and direct-acting pressure means for pressing the sheet firmly against the cling surfaces to develop pressure-induced surface clinging action.

22. The method of handling nontackly sheetlike material which includes the steps of pressing an adhesive-free surface of said material against an adhesive-free smooth surface with firm pressure to cause the material to cling by pressure-induced surface clinging action, moving said surface, performing an operation with said material which tends to forcefully slide the material along the surface, effectively resisting said sliding movement by said pressure-induced surface clinging action and removing the material from said surface by stripping it away from the surface, thereby overcoming the substantially unchanged surface clinging action.

*23. In the art of making packages from flexible and stretchable packaging material, the method of vacuum-forming the packaging material in the cavity of a package carrier comprising the steps of: applying the film across the top of the cavity; drawing the film down towards the interior surfaces of the cavity by evacuating the interior of the cavity with vacuum applied to an evacuation port while the package carrier is at a first operating station; trapping the vacuum in said cavity; moving said package carrier to a second operating station while maintaining the entrapment of the vacuum in the cavity so as to prevent any substantial movement of the film; reapplying vacuum to said evacuation port while said package carrier is in said second station; and depositing in said cavity a product to be packaged.*

*24. In the art of making packages from flexible and stretchable packaging material, the method of vacuum-forming the packaging material in the cavity of a package carrier comprising the steps of: applying the film across the entrance opening of the cavity; evacuating the interior of the cavity by applying vacuum to an evacuation port while the package carrier is at a first operating station, thereby drawing the film down towards the interior surfaces of the cavity; trapping the vacuum in said cavity; moving said package carrier horizontally to a second op-*

*erating station with the cavity opening facing upwards; maintaining said evacuation port sealed during the movement of said carrier, thereby to continue the entrapment of the vacuum in the cavity so as to prevent any significant movement of the film; reapplying vacuum to said evacuation port while said package carrier is in said second station; and depositing in said cavity opening a product to be packaged while the film is held stretched down towards the bottom of the cavity by vacuum.*

References Cited

The following references, cited by the Examiner, are of record in the patented file of this patent or the original patent.

UNITED STATES PATENTS

| | | | |
|---|---|---|---|
| 2,958,168 | 11/1960 | Vogt | 53—184 X |
| 3,000,157 | 9/1961 | Ollier et al. | 53—184 |
| 2,890,555 | 6/1959 | Hayssen | 53—228 |
| 2,902,802 | 9/1959 | Stirn et al. | 53—180 |
| 2,935,828 | 5/1960 | Mahaffy et al. | 53—180 |

TRAVIS S. McGEHEE, Primary Examiner

U.S. Cl. X.R.

53—22, 112, 184

UNITED STATES PATENT OFFICE

CERTIFICATE OF CORRECTION

Patent No. Re. 26,795 Dated Feb. 17, 1970

Inventor(s) C. E. CLOUD

It is certified that error appears in the above-identified patent and that said Letters Patent are hereby corrected as shown below:

Column 5, line 18, "violet" should be -- violent -- .
Column 6, line 75, "necesary" should be -- necessary -- .
Column 8, line 21, "axis" should be -- axes -- .

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents